United States Patent
Sato et al.

(10) Patent No.: US 10,012,894 B2
(45) Date of Patent: Jul. 3, 2018

(54) LIGHT SOURCE UNIT AND PROJECTOR

(71) Applicant: CASIO COMPUTER CO., LTD., Tokyo (JP)

(72) Inventors: Makoto Sato, Tokyo (JP); Hiroshi Ogino, Tokyo (JP); Osamu Umamine, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 15/393,642

(22) Filed: Dec. 29, 2016

(65) Prior Publication Data
US 2017/0248837 A1    Aug. 31, 2017

(30) Foreign Application Priority Data

Feb. 25, 2016  (JP) .................................. 2016-034228

(51) Int. Cl.
| | |
|---|---|
| *G03B 21/20* | (2006.01) |
| *G02B 27/14* | (2006.01) |
| *G02B 26/00* | (2006.01) |
| *H04N 9/31* | (2006.01) |

(52) U.S. Cl.
CPC ....... *G03B 21/2013* (2013.01); *G02B 26/008* (2013.01); *G02B 27/141* (2013.01); *G03B 21/204* (2013.01); *G03B 21/2066* (2013.01); *H04N 9/3114* (2013.01)

(58) Field of Classification Search
CPC .................................................. G03B 21/204
See application file for complete search history.

(56) References Cited

U.S. PATENT DOCUMENTS

| | | | | |
|---|---|---|---|---|
| 2013/0258639 A1* | 10/2013 | Hu | ............................ | F21V 9/08 |
| | | | | 362/84 |
| 2014/0333199 A1* | 11/2014 | Wang | ........................ | F21K 9/56 |
| | | | | 313/512 |
| 2015/0377430 A1* | 12/2015 | Bhakta | ................. | F21S 48/1145 |
| | | | | 362/84 |

FOREIGN PATENT DOCUMENTS

| | | |
|---|---|---|
| JP | 2012-068465 A | 4/2012 |
| JP | 2013-117705 A | 6/2013 |
| JP | 2013-235756 A | 11/2013 |
| JP | 2015-45673 A | 3/2015 |

* cited by examiner

*Primary Examiner* — Sultan Chowdhury
*Assistant Examiner* — Danell L Owens
(74) *Attorney, Agent, or Firm* — Fitch, Even, Tabin & Flannery LLP

(57) ABSTRACT

A light source unit according to an embodiment has a first light source which emits light in a first wavelength range, a second light source which emits light in a second wavelength range which differs from the light in the first wavelength range, a dichroic mirror to which the light in the first wavelength range and the light in the second wavelength range are incident from directions which differ from each other and which reflects or transmits the light in the first wavelength range and the light in the second wavelength range, and an optical device which is disposed on an optical path between the dichroic mirror and the second light source, and the optical device is a spectral member to which a coating is applied which transmits the light in the second wavelength range and reflects or absorbs the light in the first wavelength range.

20 Claims, 7 Drawing Sheets

LIGHT SOURCE UNIT AND PROJECTOR

CROSS-REFERENCE TO RELATED APPLICATION

This application is based upon and claims the benefit of priority under 35 USC 119 from Japanese Patent Application No. 2016-034228 filed on Feb. 25, 2016, the entire disclosure of which, including the specification, claims, drawings and abstract, is incorporated herein by reference.

BACKGROUND OF THE INVENTION

Field of the Invention

The present invention relates to a light source unit and a projector including this light source unit.

Description of the Related Art

In these days, projectors (projecting systems) are used on many occasions which project a screen of a personal computer and a video image, as well as images based on image data which is stored on a memory card on to a screen. These projectors are such that light emitted from a light source is collected on to a micromirror display device called a digital micromirror device (DMD) or a liquid crystal panel, so that a color image is projected on to a screen for display thereon.

The application of these projectors is expanded from a presentation in a business scene to a domestic use in association with the propagation of personal computers and video equipment such as DVD players. Conventionally, the mainstream of these projectors has been those which utilize a high-intensity discharge lamp as a light source. In recent years, however, there have been made developments of various types of projectors which use, as a light source, a plurality of semiconductor light emitting devices such as laser diodes and which include a luminescent plate which uses the semiconductor light emitting devices as an excitation light source.

A projector disclosed in Japanese Unexamined Patent Application No. 2015-45673 (JP-A-2015-45673) includes a red light source device including a red light emitting diode and a luminescent plate device having a luminescent plate such as a luminescent wheel having a luminescent material layer and a diffuse transmission area. The luminescent material layer receives light in a blue wavelength range emitted from an excitation light shining device including blue laser diodes as excitation light to emit luminous light in a green wavelength range. The diffuse transmission area transmits light emitted from the excitation light shining device while diffusing the light. The excitation light shining device also functions as a blue light source, for light emitted therefrom is transmitted diffusely through the diffuse transmission area of the luminescent plate.

Then, the excitation light shining device and the red light source device are disposed so that light emitted from the former device intersects light emitted from the latter device at right angles. A dichroic mirror is disposed in a position where light emitted from the excitation light shining device and light emitting from the red light source intersect each other at right angles. Light emitted from the excitation light shining device is transmitted through the dichroic mirror to be shone on to the luminescent plate device. On the other hand, light emitted from the red light source device is also transmitted through the dichroic mirror. Luminous light which is light emitted from the luminescent plate device is reflected by the dichroic mirror.

Here, according to the spectral characteristics of the dichroic mirror, in general, it is difficult to transmit or reflect all of light in a specific wavelength. Consequently, in the projector disclosed in JP-A-2015-45673, when light emitted from the excitation light shining device is transmitted through the dichroic mirror, there may be a case where part of the emitted light is reflected slightly by the dichroic mirror to be shone on to the red light source device. In case the projector is used over a long period of time in such a state that even a slight amount of light emitted from the excitation light shining device which uses the semiconductor light emitting devices such as laser diodes which emit highly intense light is shone on to the red light source device, there may be a case where the service life of the optical device of the red light source device is so badly affected that the service life is shortened.

SUMMARY OF THE INVENTION

When light from one light source is transmitted through or reflected by a dichroic mirror, there may be a case where a small portion of the light from the one light source is reflected by or transmitted through a dichroic mirror to be shone on to an optical device of the other light source. An object of the invention is to reduce the influence imposed on the optical device by the light so shone.

According to an aspect of the invention, there is provided a light source unit having a first light source which emits light in a first wavelength range, a second light source which emits light in a second wavelength range which differs from the light in the first wavelength range, a dichroic mirror on which the light in the first wavelength range and the light in the second wavelength range are incident from directions which are different from each other and which reflects or transmits the light in the first wavelength range and the light in the second wavelength range, and an optical device which is disposed on an optical path between the dichroic mirror and the second light source, wherein the optical device includes a spectral member to which a coating is applied which transmits the light in the second wavelength range but reflects or absorbs the light in the first wavelength range.

DETAILED DESCRIPTION OF THE PREFERRED EMBODIMENTS

First Embodiment

Figure 1:
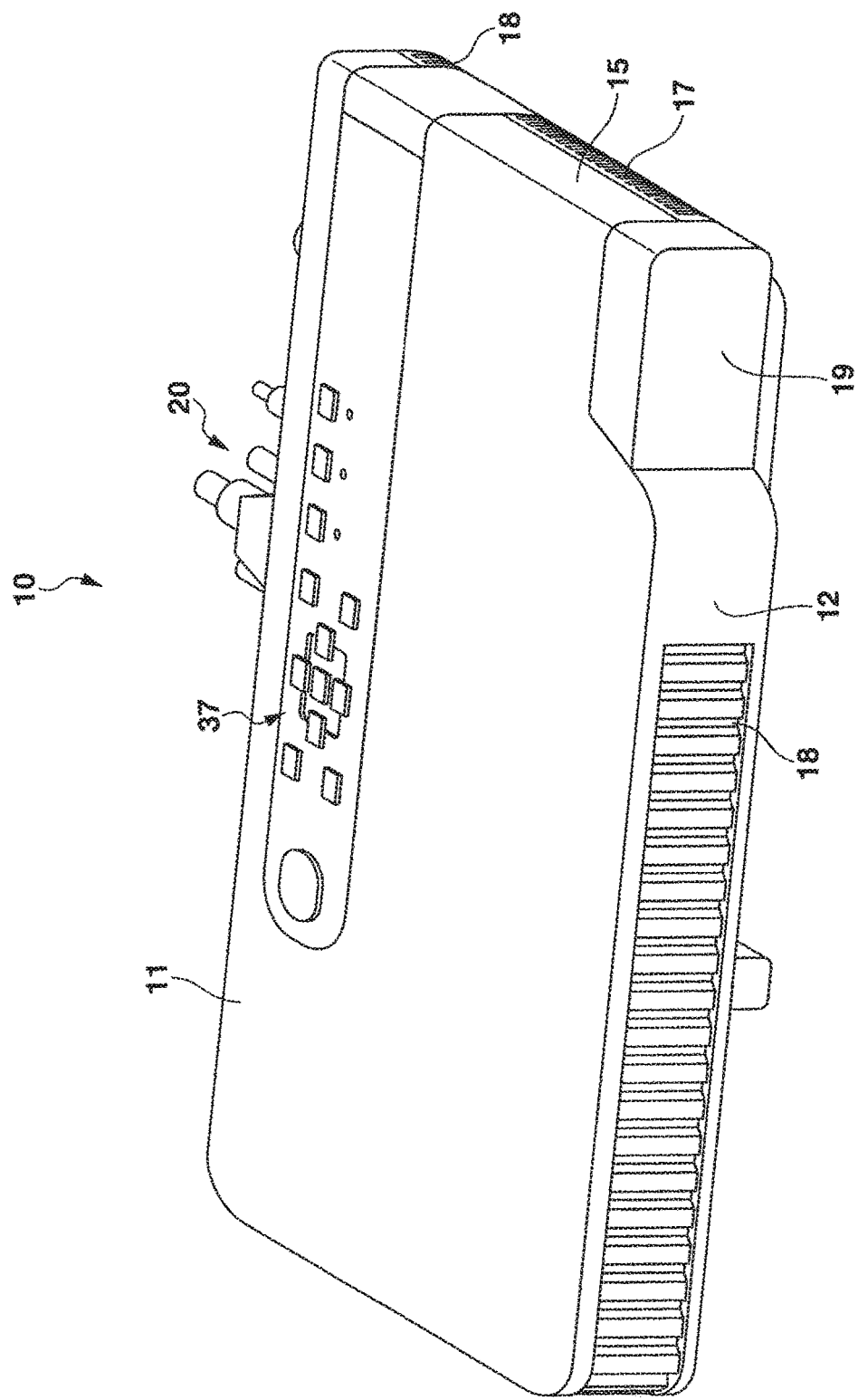
FIG. 1 is an external perspective view showing a projector according to a first embodiment of the invention.

Hereinafter, a first embodiment of the invention will be described by the use of the drawings. FIG. 1 is an external perspective view of a projector 10. In the following description, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As is shown in FIG. 1, the projector 10 has a substantially rectangular parallelepiped shape. The projector 10 has a lens cover 19 which covers a projection port which is disposed to a side of a front panel 12 which is referred to as a front side panel of a casing of the projector 10. Additionally, a plurality of inside air outlet holes 17 are provided in the front panel 12. Further, although not shown, the projector 10 includes an IR reception unit which receives a control signal from a remote controller.

In addition, a keys/indicators unit 37 is provided on an upper panel 11 of the casing. Disposed on this keys/indicators unit 37 are keys and indicators which include a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat.

Further, various types of terminals (groups) 20 which include an input/output connector unit, a power supply adaptor plug and the like are provided in a back side or a back panel of the casing. The input/output connector unit includes a USB terminal, a video signal input D-SUB terminal into which analog RGB video signals are inputted, an S terminal, an RCA terminal, a voice output terminal and the like. Additionally, a plurality of outside air inlet holes are formed in the back panel. A plurality of inside air outlet holes 17 are formed individually in a right panel, not shown, which constitutes a side panel of the casing, a left panel 15 which constitutes a side panel shown in FIG. 1, and the front panel 12. In addition, outside air inlet holes 18 are also formed in a corner portion of the left panel 15 which is formed between the back panel and itself.

Figure 2:
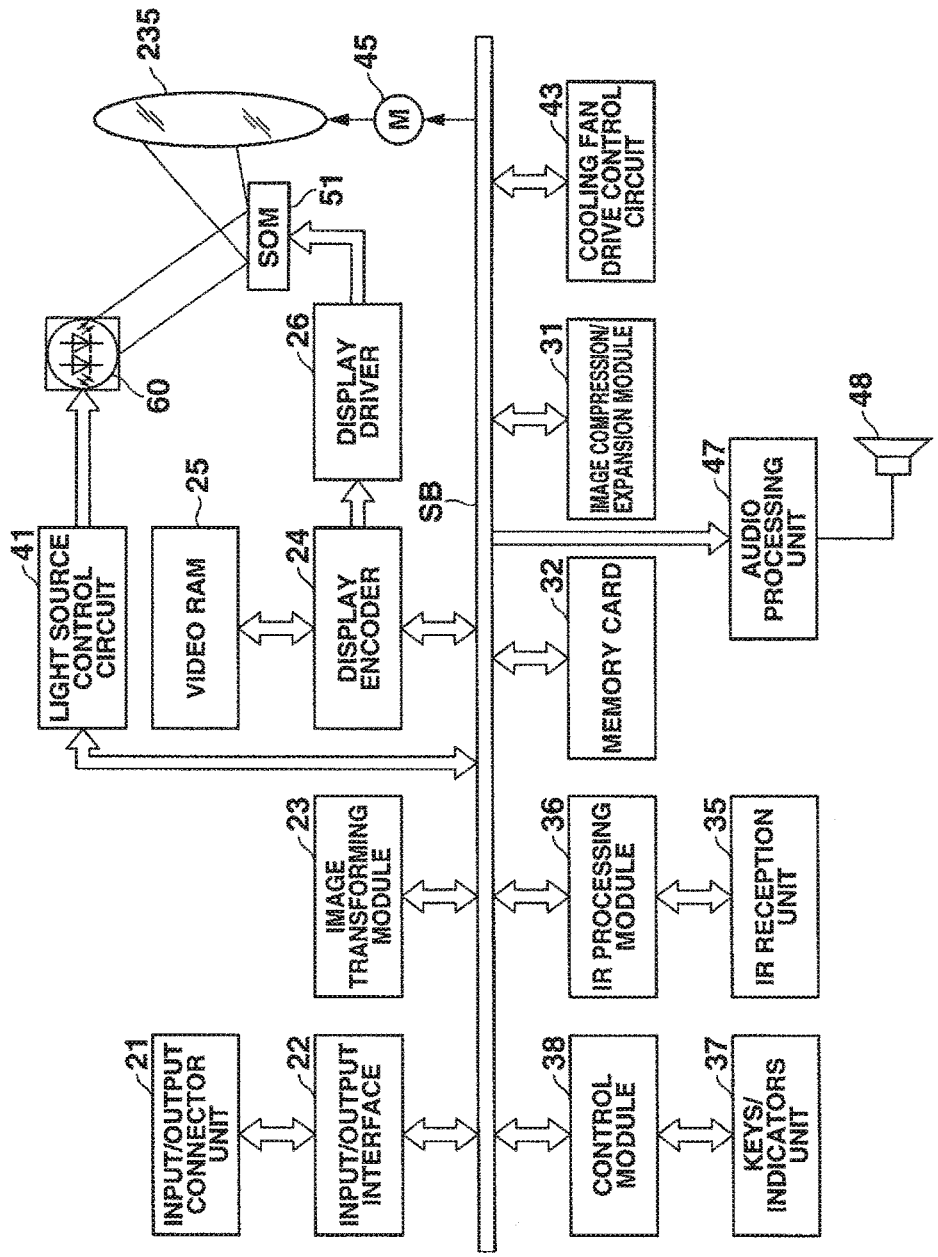
FIG. 2 is a block diagram showing functional blocks of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 10 and is made up of a CPU, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control device. The display driver 26 drives a display device 51, which is a spatial optical modulator (SOM), at an appropriate frame rate in response to the image signal outputted from the display encoder 24. The display driver 26 shines a pencil of light which is emitted from a light source unit 60 onto the display device 51 via a light source-side optical system, which will be described later, whereby an optical image is formed by using reflected light which is reflected by the display element 51. The image so formed is then projected on to a screen, not shown, for display thereon via a projection-side optical system. In addition, a movable lens group 235 of the projection-side optical system is driven by a lens motor 45 for zooming or focusing.

An image compression/expansion module 31 performs the following operation. The image compression/expansion module 31 performs a recording operation in which a luminance signal and a color difference signal of an image signal are data compressed through ADCT and Huffman coding processes and the compressed data is sequentially written on a memory card 32 which is configured as a detachable recording medium.

Further, when in a reproducing mode, the image compression/expansion module 31 performs the following operation. Specifically, the image compression/expansion module 31 reads out image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the main keys and indicators which are provided on the upper panel 11 of the casing are sent out directly to the control module 38. Key operation signals from the remote controller are received by the IR reception unit 35, and a code signal demodulated at an IR processing module 36 is outputted to the control module 38.

An audio processing unit 47 is connected to the control module 38 via the system bus (SB). This audio processing module 47 includes a circuitry for a sound source such as a PCM sound source or the like. When in a projection mode and a reproducing mode, the audio processing unit 47 converts audio data into analog signals and drives a loud speaker 48 to output loudly sound or voice based on the audio data.

The control module 38 controls a light source control circuit 41 which is configured as a light source control unit. The light source control circuit 41 controls individually the operations of an excitation light source and a red light source device so as to emit light in red and blue wavelength ranges, respectively, at predetermined timings so that light in the specified wavelength ranges which is required in producing an image is emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections.

Additionally, the control module 38 also causes the cooling fan drive control circuit 43 to keep the cooling fans rotating even after the power supply to a projector main body is switched off by use of a timer. Alternatively, the control module 38 causes the cooling fan drive control circuit 43 to cut off the power supply to a main body of the projector 10 depending upon the results of the temperature detections by the temperature sensors.

Figure 3:
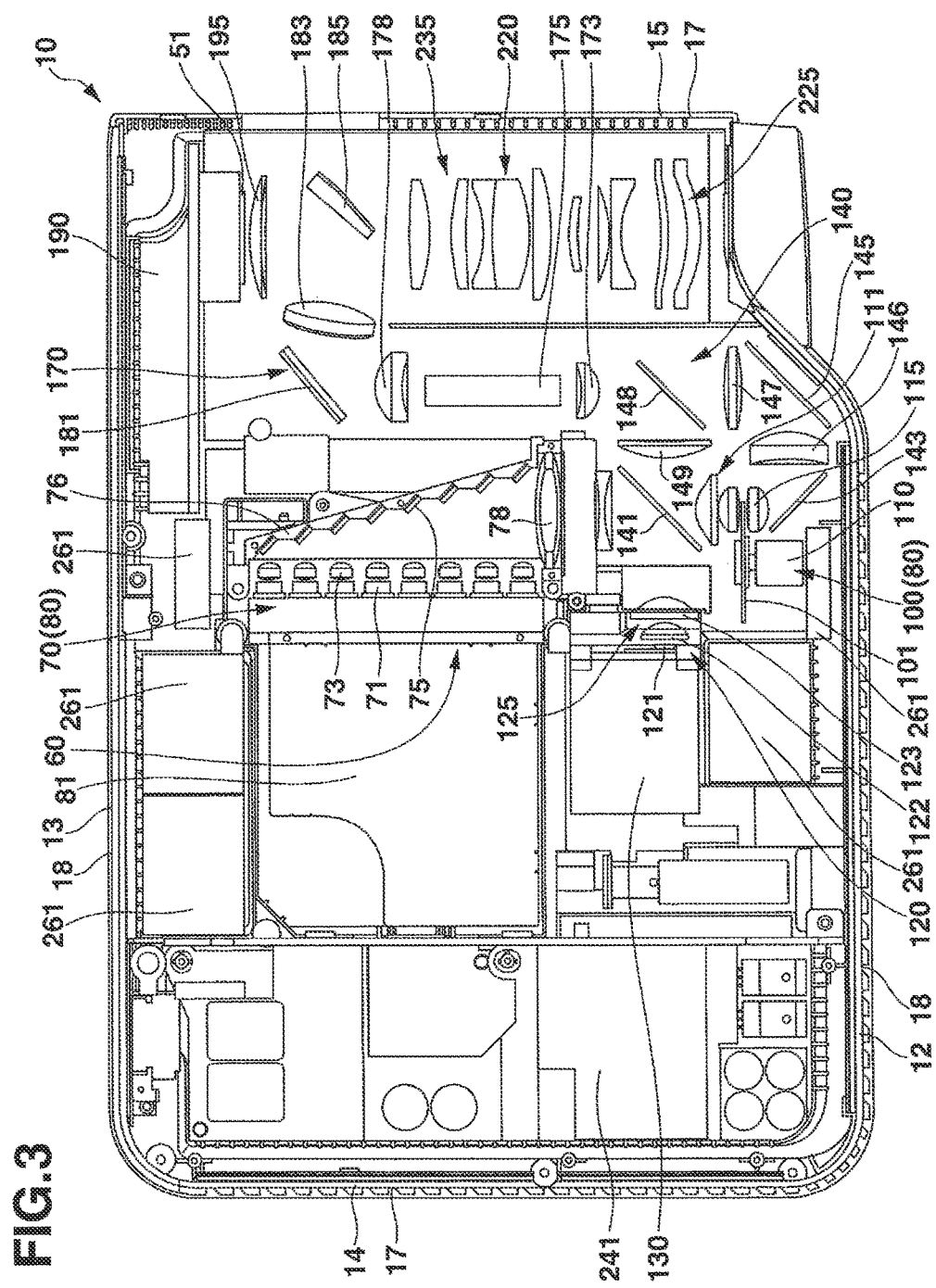
FIG. 3 is a schematic plan view showing an internal construction of the projector according to the first embodiment of the invention.

Next, an internal construction of the projector 10 will be described based on FIG. 3. FIG. 3 is a schematic plan view showing the internal construction of the projector 10. The projector 10 includes a control circuit board 241 which is provided near the right panel 14. This control circuit board 241 includes a power supply circuit block and a light source control block. The projector 10 includes the light source unit 60 which is provided at a side of the control circuit board 241, that is, at a substantially central portion of the casing of the projector 10. Further, the projector 10 includes a light source-side optical system 170 and a projection-side optical system 220 which are disposed between the light source unit 60 and the left panel 15.

The light source unit 60 includes an excitation light shining device 70, a red light source device 120 and a green light source device 80. The excitation light shining device 70 is a light source of light in a blue wavelength range which is light in a first wavelength range and doubles as an excitation light source. The red light source device 120 is a light source of light in a red wavelength range which is light in a second wavelength range. The green light source device 80 is a light source of light in a green wavelength range which is light in a third wavelength range. The green light source device 80 is made up of the excitation light shining device 70 and a luminescent plate device 100. The light source unit 60 also includes a light guiding optical system 140 which guides light in the blue wavelength range, light in the green wavelength range and light in the red wavelength range. The light guiding optical system 140 guides lights in the blue, green and red wavelength ranges which are emitted from the blue, green and red light source devices to an incident port of a light tunnel 175.

The excitation light shining device 70 is disposed in a position which lies substantially in a center in a left-right or transverse direction of the casing of the projector 10 and near the back panel 13. The excitation light shining device 70 includes a group of light sources made up of blue laser diodes 71 which constitutes a first light source, a group of reflecting mirrors 75, a collective lens 78, and a heat sink 81. The group of light sources is made up of the plurality of blue laser diodes 71 which are semiconductor light emitting devices. The blue laser diodes 71 are disposed so that optical axes thereof become parallel to the back panel 13. The group of reflecting mirrors 75 changes the direction of axes of lights emitted from the blue laser diodes 71 through 90 degrees in the direction of the front panel 12. The collective lens 78 collects lights emitted from the blue laser diodes 71 and reflected by the group of reflecting mirrors 75. The heat sink 81 is disposed between the blue laser diodes 71 and the right panel 14.

The group of light sources is made up by arranging the plurality of laser diodes 71 which are semiconductor light emitting devices into a matrix configuration. Collimator lenses 73 are disposed individually on optical axes of the blue laser diodes 71. The collimator lenses 73 convert lights emitted from the blue laser diodes 71 into parallel rays so as to enhance the directivity of the lights emitted from the laser diodes 71. The group of reflecting mirrors 75 is made up of a plurality of reflecting mirrors which are arranged into a step-like configuration and is integrated with a mirror substrate 76 while adjusting positions of the reflecting mirrors. The group of reflecting mirrors 75 narrows sectional areas of pencils of light emitted from the blue laser diodes 71 in one direction for emission to the collective lens 78.

A cooling fan 261 is disposed between the heat sink 81 and the back panel 13, so that the blue laser diodes 71 are cooled by this cooling fan 261 and the heat sink 81. Further, a cooling fan 261 is also disposed between the group of reflecting mirrors 75 and the back panel 13, so that the group of reflecting mirrors 75 and the collective lens 78 are cooled by the cooling fan 261.

The red light source 120 includes a red light source 121 which is disposed so that an optical axis thereof becomes parallel to the blue laser diodes 71 and which constitutes a second light source and a group of collective lenses 125 which collects light emitted from the red light source 121. This red light source 121 is a red light emitting diode which is a semiconductor light emitting device which emits light in the red wavelength range. Then, the red light source device 120 is disposed so that an axis of light in the red wavelength range emitted by the red light source device 120 intersects an axis of light in the blue wavelength range emitted from the excitation light shining device 70 and an axis of light in the green wavelength range emitted from a luminescent plate 101. Further, the red light source device 120 includes a heat sink 130 which is disposed on a side of the red light source 121 which faces the right panel 14. A cooling fan 261 is disposed between the heat sink 130 and the front panel 12, so that the red light source 121 is cooled by this cooling fan 216 and the heat sink 130.

The group of collective lenses 120 is an optical device and is made up of a first lens 122 which is disposed on an exit side of the red light source 121 which constitutes the second light source and a second lens 123 which is disposed on an exit side of the first lens 122. The first lens 122 and the second lens 123 are both made up of plastic lenses. A coating is applied to a surface of the exit side of the second lens 123 where light in the red wavelength range, which is light in the second wavelength range, exits. This coating has a spectral characteristic where the coating reflects light in the blue wavelength range which is light in the first wavelength range and transmits light in the red wavelength range which is light in the second wavelength range. The second lens 123 which is a spectral member will be described in detail later.

The luminescent plate device 100 which makes up the green light source device 80 is disposed on an optical path of excitation light emitted from the excitation light shining device 70 and near the front panel 12. The luminescent plate device 100 includes the luminescent plate 101, a motor 110 which drives to rotate the luminescent plate 101, a group of collective lenses 111 and a collective lens 115. The luminescent plate 101 is a luminescent wheel which is disposed so as to be at right angles to an axis of light emitted from the excitation light shining device 70. The group of collective lenses 111 collects a pencil of excitation light emitted from the excitation light shining device 70 to the luminescent plate 101 and also collects a pencil of light emitted from the luminescent plate 101 in the direction of the back panel 13. The collective lens 115 collects a pencil of light emitted from the luminescent plate 101 in the direction of the front panel 12. A cooling fan 261 is disposed between the motor 110 and the front panel 12, so that the luminescent plate device 100 is cooled by this cooling fan 261.

The luminescent plate 101 includes a luminous light emitting area and a diffuse transmission area which are provided continuously in an end-to-end fashion in a circumferential direction. The luminous light emitting area receives light emitted from the excitation light shining device 70 via the group of lenses 111 as excitation light to emit luminous light in the green wavelength range which is light in the third wavelength range. The diffuse transmission area transmits excitation light which is light emitted from the excitation light shining device or transmits the excitation light while diffusing it.

A base material of the luminescent plate 101 is a metallic base material formed of copper, aluminum or the like. A groove is formed on a surface of the base material which faces the excitation light shining device 70. A bottom portion of the groove is mirror finished through silver deposition or the like. Then, a layer of green luminescent material is laid on a surface of the mirror finished portion. Further, in the case of the diffuse transmission area which transmits excitation light or transmits excitation light while diffusing it being formed as a transmission area, a transparent base material having a light transmission property is fitted in a through hole portion formed by cutting out part of the base material. In the case of the diffuse transmission area being formed as a diffuse transmission area, a transparent material on a surface of which minute irregularities are formed thorough sandblasting is fitted in the through hole portion.

When light in the blue wavelength range emitted from the excitation light shining device 70 is shone on to the green luminescent material layer of the luminescent plate 101 as excitation light, the green luminescent material in the green luminescent material layer of the luminescent plate 101 is excited, whereby light in the green wavelength range is emitted in every direction from the green luminescent material. A pencil of light which is emitted luminously is emitted towards the back panel 13 to be incident on the group of collective lenses 111. On the other hand, light in the blue wavelength range from the excitation light shining device 70 which is incident on the diffuse transmission area of the luminescent plate 101 which transmits incident light directly or diffusely is transmitted directly or diffusely through the luminescent plate 101 to be incident on the collective lens 115 which is disposed on a back surface side (in other words, a side facing the front panel 12) of the luminescent plate 101.

The light guiding optical system 140 includes collective lenses which collect pencils of light in the red, green and blue wavelength ranges, reflecting mirrors which change the directions of axes of the pencils of light in the red, green and blue wavelength ranges so as to be directed into the same direction and the like. Specifically, the light guiding optical system 140 includes a first dichroic mirror 141 in a position where light in the blue wavelength range emitted from the excitation light shining device 70 and light in the green wavelength range emitted from the luminescent plate 101 intersect light in the red wavelength range emitted from the red light source device 120. The first dichroic mirror 141 transmits both lights in the blue and red wavelength ranges and reflects light in the green wavelength range in such a way as to change the direction of the axis of the light in the green wavelength range through 90 degrees in the direction of the left panel 15. Namely, the first dichroic mirror 141 is disposed substantially at 45 degrees with respect to light in the first wavelength range and light in the second wavelength range.

A first reflecting mirror 143 is disposed on the axis of light in the blue wavelength range which is transmitted directly or diffusely through the luminescent plate 101, that is, between the collective lens 115 and the front panel 12. This first reflecting mirror 143 reflects light in the blue wavelength range so that the direction of the axis of the light in the blue wavelength range is changed through 90 degrees in the direction of the left panel 15. A collective lens 146 is disposed on a side of the first reflecting mirror 143 which faces the left panel 15, and a second reflecting mirror 145 is disposed on a side of this collective lens 146 which faces the left panel 15. A collective lens 147 is disposed on a side of the second reflecting mirror 145 which faces the back panel 13. The second reflecting mirror 145 changes the direction of the axis of light in the blue wavelength range which is reflected by the first reflecting mirror 143 to be incident thereon via the collective lens 146 through 90 degrees in the direction of the back panel 13.

A collective lens 149 is disposed on a side of the first dichroic mirror 141 which faces the left panel 15. A second dichroic mirror 148 is disposed on a side of the collective lens 149 which faces the left panel 15 and a side of the collective lens 147 which faces the back panel 13. The second dichroic mirror 148 reflects light in the red wavelength range and light in the green wavelength range so that the directions of the axes of the red and green lights are changed through 90 degrees in the direction of the back panel 13 and transmits light in the blue wavelength range.

The axis of light in the red wavelength range which is transmitted through the first dichroic mirror 141 and the axis of light in the green wavelength range which is reflected by the first dichroic mirror 141 so as to coincide with the axis of the light in the red wavelength range are directed to the collective lens 149 so that the red light and the green light are incident on the collective lens 149. Then, the lights in the red and green wavelength ranges which are transmitted through the collective lens 49 are then reflected by the second dichroic mirror 148 to be collected to the incident port of the light tunnel 175 via a collective lens 173 of the light source-side optical system 170. On the other hand, light in the blue wavelength range which is transmitted through the collective lens 147 is then transmitted through the second dichroic mirror 148 to be collected to the incident port of the light tunnel 175 via the collective lens 173.

The light source-side optical system 170 includes the collective lens 173, the light tunnel 175, a collective lens 178, a light axis changing mirror 181, a collective lens 183, a shining mirror 185 and a condenser lens 195. Since the condenser lens 195 emits image light emitted from the display device 51 which is disposed on a side of the condenser lens 195 which faces the back panel 13 towards the projection-side optical system 220, the condenser lens 195 also constitutes part of the projection-side optical system 220.

The collective lens 173 is disposed near the light tunnel 175, and this collective lens 173 collects light source light to the incident port of the light tunnel 175. Consequently, light in the red wavelength range, light in the green wavelength range and light in the blue wavelength range are collected by the collective lens 173 to be incident on the incident port of the light tunnel 175. When having been incident on the light tunnel 175, the pencils of light in the red, green and blue wavelength ranges are converted into pencils of light whose intensities are distributed uniformly by the light tunnel 175.

The light axis changing mirror 181 is disposed on an optical axis of the light tunnel 175 on a side thereof which faces the back panel 13 via the collective lens 178. The pencils of light which exit from an exit port of the light tunnel 175 are collected by the collective lens 178, whereafter the directions of the axes of the pencils of light are changed to be directed towards the left panel 15.

The pencils of light reflected by the axis changing mirror 181 are collected by the collective lens 183, whereafter the pencils of light are shone on to the display device 51 at a predetermined angle via the condenser lens 195 by the shining mirror 185. A heat sink 190 is provided on aside of the display device 51, which is a DMD, which faces the back panel 13, so that the display device 51 is cooled by the heat sink 190.

The pencils of light, which is light source light, which are shone on to an image forming surface of the display device 51 by the light source-side optical system 170 are reflected on the image forming surface of the display device 51 and are then projected on to a screen via the projection-side optical system 220 as projected light. Here, the projection-side optical system 220 includes the condenser lens 195, the movable lens group 235 and a fixed lens group 225. The movable lens group 235 is made to be moved by the lens motor. Then, the movable lens group 235 and the fixed lens group 225 are incorporated in fixed lens barrels. Thus, the fixed lens barrel which incorporates the movable lens group 235 is made as a variable-focus lens which can be adjusted for zooming or focusing.

By configuring the projector 10 in the way described heretofore, when the luminescent plate 101 is rotated and excitation light and red light are emitted from the excitation light shining device 70 and the red light source device 120, respectively, at different timings, lights in the red, green and blue wavelength ranges are incident sequentially on the collective lens 173 and the light tunnel 175 byway of the light guiding optical system 140 and are then incident on the display device 51 by way of the light source-side optical system 170. Thus, the DMD, which is the display device 51 of the projector 10, displays the red light, the green light and the blue light in a time sharing fashion according to data, whereby a color image can be projected on to the screen.

Figure 4:
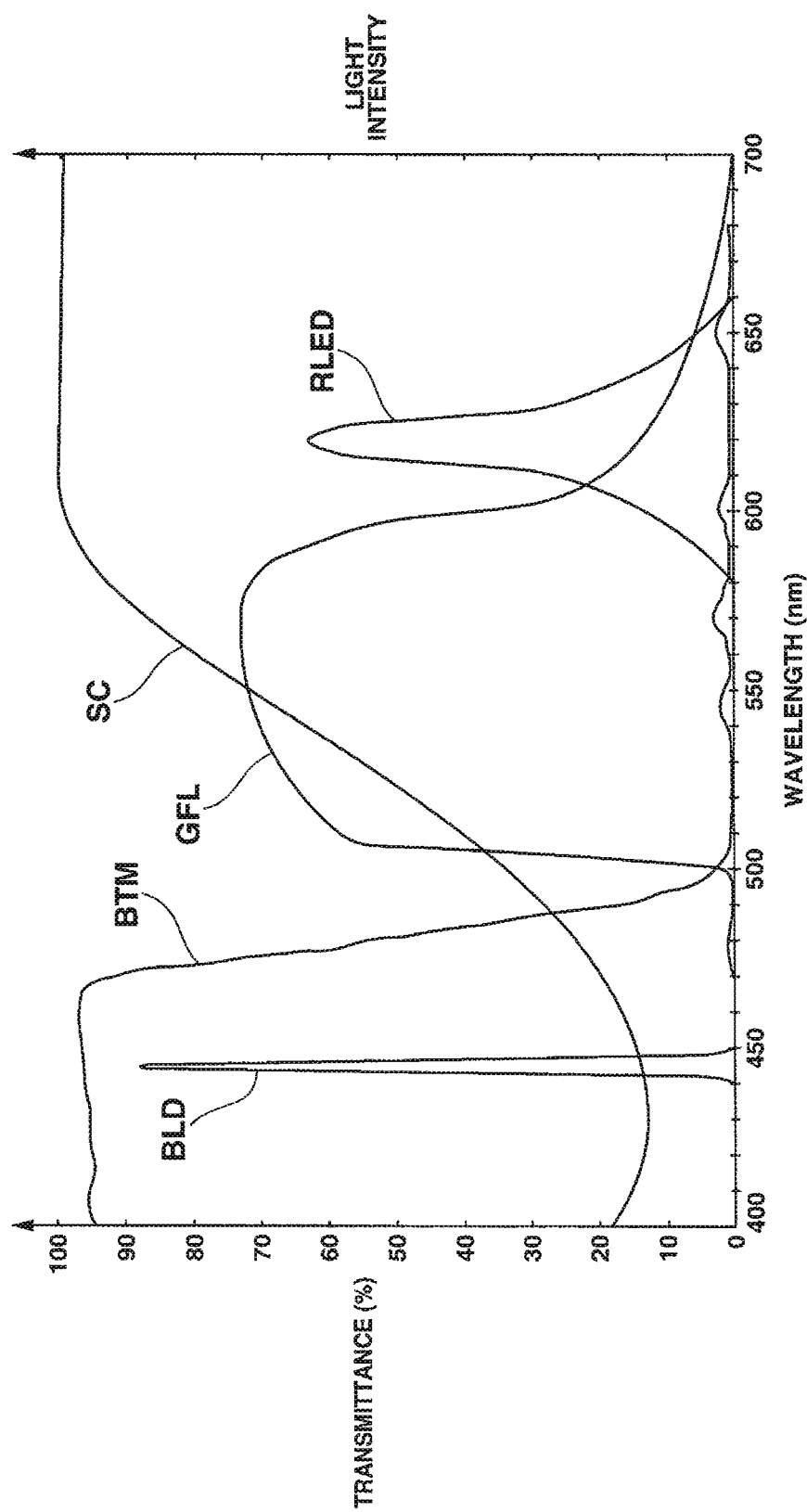
FIG. 4 is a graph showing transmittances relative to wavelengths on a second lens to which a coating is applied and a first dichroic mirror of the projector according to the first embodiment of the invention and wavelength distributions and light intensities of lights in red, green and blue wavelength ranges which are transmitted through or reflected by the first dichroic mirror.

Next, referring to FIG. 4, the second lens 123 will be described which is a spectral member of the group of collective lenses 125 which is the optical device of the red light source device 120. FIG. 4 shows spectra of lights in the red, green and blue wavelength ranges and transmittances of the first dichroic mirror 141 and the coating which is applied to the second lens 123. In FIG. 4, light BLD whose wavelength is distributed from about 440 nm to about 450 nm is a spectrum of light in the blue wavelength range emitted from the blue laser diodes 71 of the excitation light shining device 70 which is the first light source. Similarly, light GFL whose wavelength is distributed from about 500 nm to about 700 nm is a spectrum of light in the green wavelength range emitted from the luminescent plate device 100. In addition, light RLED whose wavelength is distributed from about 580 nm to about 660 nm is a spectrum of light in the red wavelength range emitted from the red light source 121 of the red light source device 120 which constitutes the second light source.

In FIG. 4, BTM indicated by a solid line denotes a transmittance of the first dichroic mirror 141. As indicated by the solid line BTM, almost all light whose wavelength is equal to or shorter than about 470 nm is transmitted through the first dichroic mirror 141. Light whose wavelength is longer than about 470 nm but is equal to or shorter than about 510 nm is partially transmitted through the first dichroic mirror 141 and the other light is reflected by the first dichroic mirror 141. Almost all light whose wavelength is longer than about 510 nm is reflected by the first dichroic mirror 141.

In FIG. 4, SC indicated by a solid line denotes a transmittance of the coating applied to the second lens 123. As indicated by the solid line SC, about 80% of light whose wavelength is equal to or shorter than about 460 nm is reflected by the coating. Almost all light whose wavelength is equal to or longer than about 590 nm is transmitted through the coating.

As shown in FIG. 4, almost all the light BLD which is light in the blue wavelength range which is transmitted through the first dichroic mirror 141 is transmitted through the first dichroic mirror 141. However, a small portion (on the order of about 5%) of the light BLD which is light in the blue wavelength range is reflected by the first dichroic mirror 141. As shown in FIG. 3, a small portion of light in the blue wavelength range emitted from the excitation light shining device 70 and reflected by the first dichroic mirror 141 is shone on to the group of collective lenses 125 of the red light source device 120 (specifically speaking, the second light 123). Here, as described above, the coating having the spectral characteristic indicated by the solid line SC in FIG. 4 is applied to the surface of the exit side of the second lens 123. Consequently, the small portion of the light in the blue wavelength range which is shone on to the second lens 123 is reflected by the coating applied to the second lens 123. The small portion of the light in the blue wavelength range reflected by the coating of the second lens 123 is transmitted through the first dichroic mirror 141.

On the other hand, most of light RLED in the red wavelength range emitted from the red light source 121 which is the second light source is transmitted through the coating of the second lens 123 as shown in FIG. 4.

In this way, much of the small portion of the light in the blue wavelength range which is reflected towards the red light source device 120 by the first dichroic mirror 141 is reflected by the coating of the second lens 123 which is a spectral member. Consequently, the amount of the small portion of the light in the blue wavelength range shone on to the first lens 122 and the second lens 123 which are made up of plastic lenses can be reduced. This can reduce the influence (for example, clouding the lenses) on the first lens 122 and the second lens 123 even though the projector 10 is used over a long period of time in such a state that a small portion of highly intense light from the blue laser diodes 71 is kept shone on to the red light source device 120.

In this embodiment, of the first lens 122 and the second lens 123 of the group of collective lenses 125 which constitutes the optical device of the red light source 121, the coating is applied to the surface on the exit side of the second lens 123 where light in the red wavelength range exits, whereby the second lens 123 is configured as the spectral member. As a modified example, a configuration may be adopted in which a second lens 123 made up of a glass lens is disposed on an exit side of a first lens 122 which is made up of a plastic lens where light in the red wavelength range which is light in the second wavelength range, and a coating which reflects light in the blue wavelength range but transmits light in the red wavelength range is applied to an exit side, or an incident or entrance side, or both on the exit side and the entrance side, whereby the second lens 123 is made as a spectral member.

As another modified example, a configuration may be adopted in which a second lens 123 is made up of a glass lens, and the coating is applied to an exit side of a first lens 122 which is made up of a plastic lens, whereby the first lens 122 is made as a spectral member. The spectral member which is made up of the plastic lens may have the coating applied only to the exit side or to both the sides thereof. Further, as the coating applied to the spectral member, in addition to the coating which transmits light in the red wavelength range but reflects light in the blue wavelength range, a coating can be adopted which transmits light in the red wavelength range and absorbs light in the blue wavelength range.

In this embodiment, while the first dichroic mirror 141 is configured to transmit both light in the red wavelength range and light in the blue wavelength range, the light guiding optical system 140 may be configured to transmit either of light in the red wavelength range and light in the blue wavelength range while reflecting the other.

Second Embodiment

Figure 5:
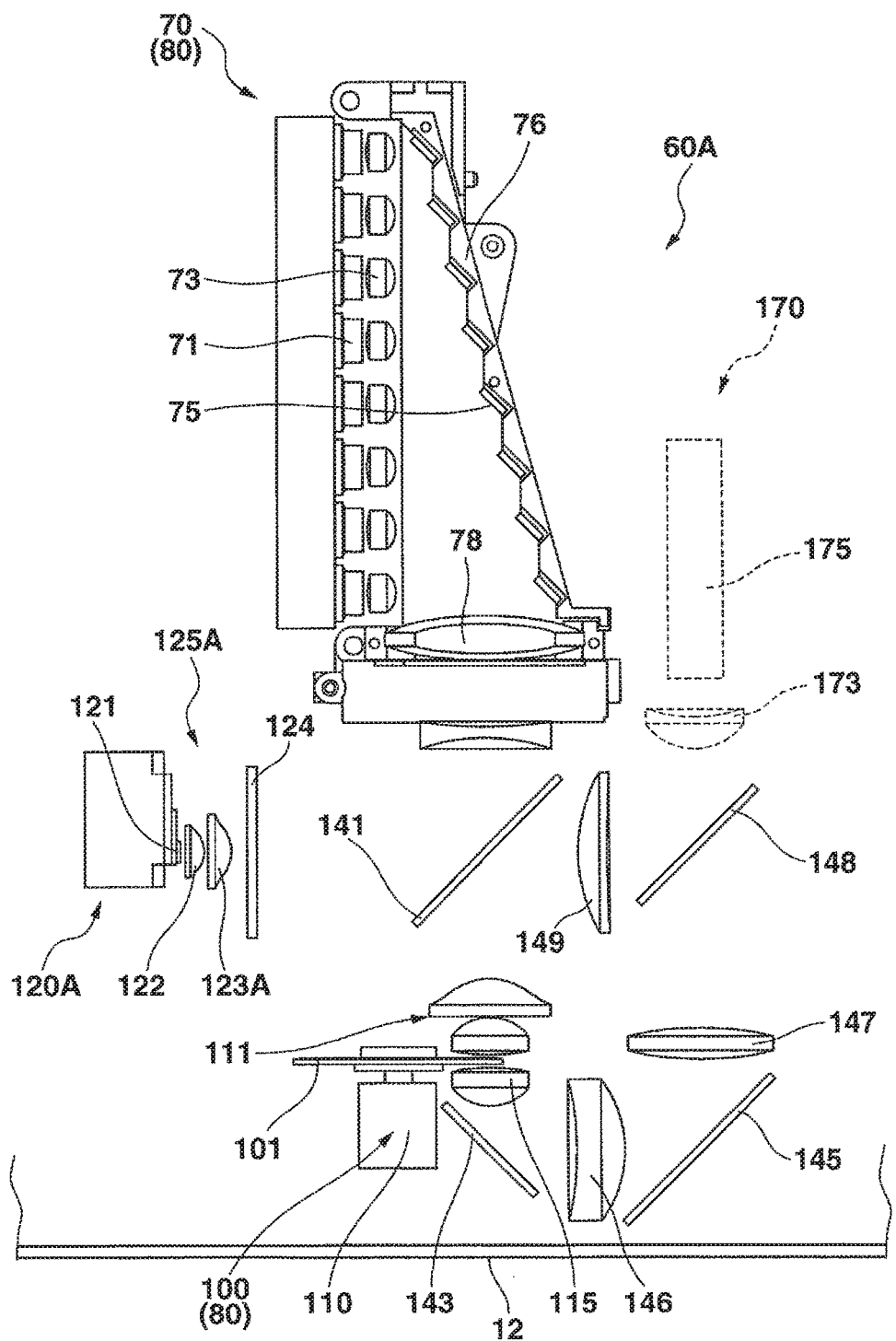
FIG. 5 is a schematic plan view showing a main part of a light source unit according to a second embodiment of the invention.

Nest, referring to FIG. 5, a second embodiment of the invention will be described. In describing this embodiment, like reference numerals will be given to like members or portions to those of the first embodiment, and the description thereof will be omitted or simplified.

In this embodiment, in place of the light source unit 60 of the first embodiment, a light source unit 60A is provided which includes a red light source device 120A having an optical device 125A including a spectral plate 124 as a spectral member. The spectral plate 124 is formed of a glass plate or the like, and a coating which absorbs light in the blue wavelength range and transmits light in the red wavelength range is applied to one or both surfaces of the spectral plate 124. On the other hand, a first lens 122 and a second lens 123A are both formed of plastic lenses, and the coating described above is not applied to them. A configuration may be adopted in which either of the first lens 122 and the second lens 123A may be formed of a plastic lens and the other may be a glass lens.

According to this embodiment, even though a small portion of light in the blue wavelength range emitted from blue laser diodes 71 and reflected by a first dichroic mirror 141 is shone on to the optical device 125A of the red light source device 120A, most of the small portion of light in the blue wavelength range is absorbed by the spectral plate 124. Consequently, the influence imposed on the first lens 122 and the second lens 123A by the small portion of light in the blue wavelength range can be reduced.

In this embodiment, the spectral plate 124 is provided separately from the first lens 122 and the second lens 123A as the spectral member. Consequently, although there is a case where the coating of the spectral plate 124 keeps absorbing light in the blue wavelength range over a long period of time to thereby be heated, the influence imposed on the first lens 122 and the second lens 123A by the heat so generated can be reduced.

Third Embodiment

Next, referring to FIG. 6, a third embodiment of the invention will be described. In this embodiment, like reference numerals will be given to like members or portions to those of the first embodiment, and the description thereof will be omitted or simplified.

In this embodiment, in place of the light source unit 60 of the first embodiment, a light source unit 60B is provided in which the configurations of the green light source device 80 and the excitation light shining device 70 are altered. In this light source unit 60B, an excitation light shining device 70B is disposed on a side of a first dichroic mirror 141B which faces a left panel 15 (a right-hand side in FIG. 6). The excitation light shining device 70B includes a plurality of blue laser diodes 71 which constitute a first light source and collimator lenses 73 which are disposed so as to correspond to the blue laser diodes 71. Consequently, light in the blue wavelength range which is light in a first wavelength range is emitted from the excitation light shining device 70 to be incident on a first dichroic mirror 141B.

A red light source device 120 like the red light source device 120 of the first embodiment is disposed in a position which faces the excitation light shining device 70B across the first dichroic mirror 141B. The red light source device 120 includes a red light emitting diode which constitutes a red light source 121 which is a second light source. Light in the red wavelength range which is light in a second wavelength range is emitted towards the first dichroic mirror 141B. On the other hand, a luminescent plate device 100B is disposed on a side of the first dichroic mirror 141B which faces a back panel 13 (an upper side in FIG. 6) in a direction in which the luminescent plate device 100B intersects axes of lights emitted from the excitation light shining device 70B and the red light source device 120 at right angles. The luminescent plate device 100B includes a fixed luminescent plate 101B. A green luminescent material layer is laid on the luminescent plate 101B, and when excitation light is shone on to the luminescent plate 101B, the luminescent material layer emits luminous light in the green wavelength range which is light in the third wavelength range. Light emitted from the luminescent plate device 100B is incident on the first dichroic mirror 141B. In this way, a green light source device 80B is made up of the excitation light source 70B and the luminescent plate device 100B.

The first dichroic mirror 141B reflects both light in the blue wavelength range and light in the red wavelength range and transmits light in the green wavelength range. Light in the blue wavelength range and light in the red wavelength range are reflected in opposite directions by the first dichroic mirror 141B. Consequently, the direction of excitation light in the blue wavelength range emitted from the excitation light shining device 70B is changed through 90 degrees in the direction of the back panel 13. The direction of light in the red wavelength range emitted from the red light source device 120 is changed through 90 degrees in the direction of the front panel 120 by the first dichroic mirror 141B. Light in the green wavelength range emitted from the luminescent plate device 100B is transmitted through the first dichroic mirror 141B.

Figure 6:
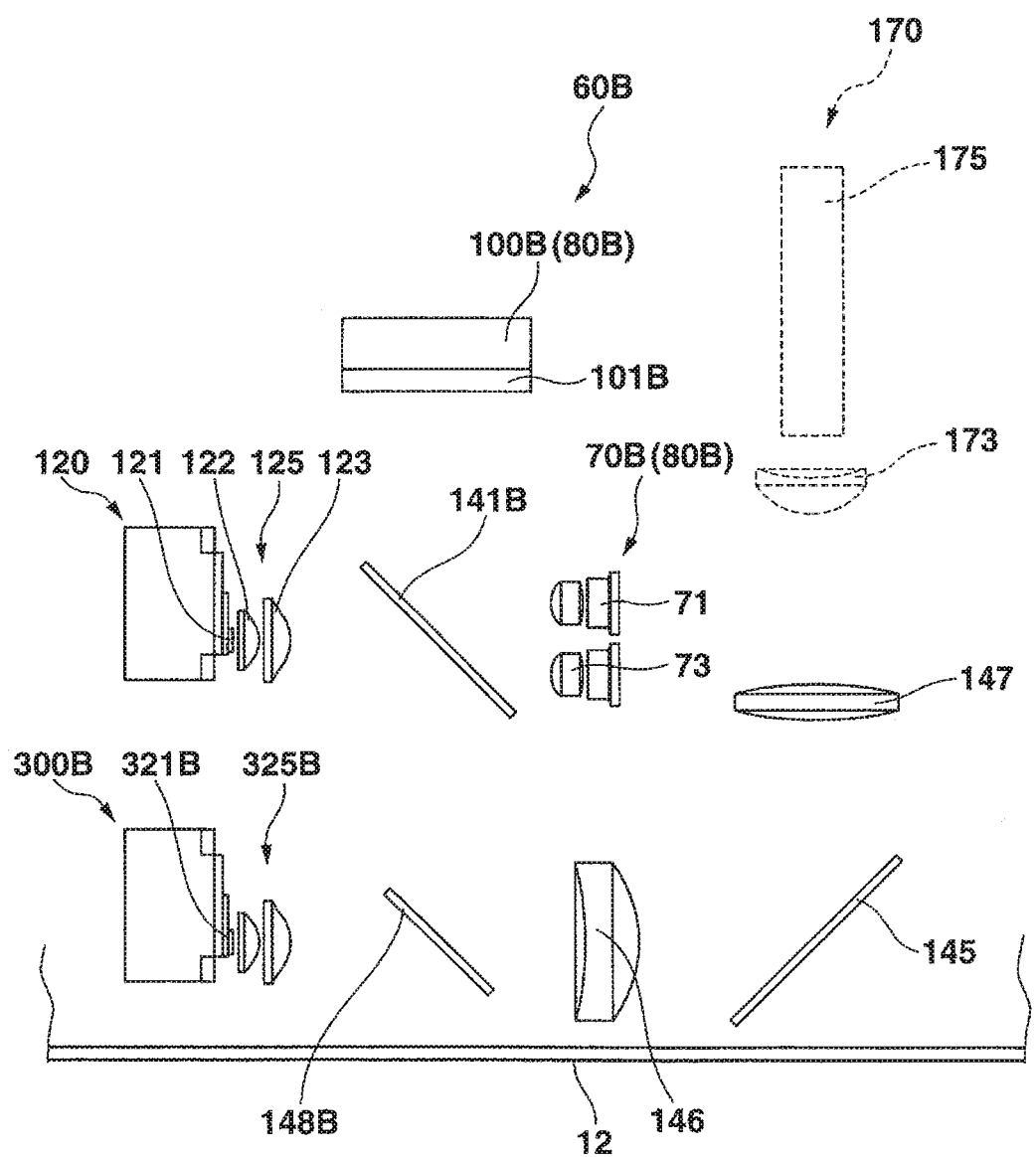
FIG. 6 is a schematic plan view showing a main part of a light source unit according to a third embodiment of the invention.

A second dichroic mirror 148B is provided on a side of the first dichroic mirror 141B which faces a front panel 12 (a lower side in FIG. 6). Then, a blue light source device 300B is provided on a side of the second dichroic mirror 148B which faces a right panel 14 (a left-hand side in FIG. 6). The blue light source device 300B includes a blue light source 321B and a group of collective lenses 325B which collects light emitted from the blue light source 321B. The blue light source 321B is a blue light emitting diode.

The second dichroic mirror 148B reflects light in the red wavelength range and light in the green wavelength range but transmits light in the blue wavelength range. Consequently, light in the red wavelength range reflected by the first dichroic mirror 141B and light in the green wavelength range transmitted through the first dichroic mirror 141B are reflected towards the left panel 15 (rightwards in FIG. 6) by the second dichroic mirror 148B. On the other hand, light in the blue wavelength range emitted from the blue light source device 300B is transmitted through the second dichroic mirror 148B.

In this way, lights in the red, green and blue wavelength ranges are collected by a collective lens 146 by way of the second dichroic mirror 148B. The lights in the red, green and blue wavelength ranges emitted from the collective lens 146 are collected to an incident port of a light tunnel 175 by way of a second reflecting mirror 145, a collective lens 147 and a light source-side optical system 170.

In this embodiment, almost all light in the blue wavelength range emitted from the excitation light shining device 70B is reflected by the first dichroic mirror 141B to be shone on to the luminescent plate device 100B. However, a small portion of light in the blue wavelength range emitted from the excitation light shining device 70B is transmitted through the first dichroic mirror 141B to be shone on to a group of collective lenses 125 of the red light source device 120. As described above, a second lens 123 of the group of collective lenses 125 of the red light source device 120 is made up of a plastic lens, and a coating which reflects light in the blue wavelength range but transmits light in the red wavelength range is applied to a surface on an exit side of the second lens 123. Consequently, the influence imposed on the group of collective lenses 125 by the small portion of the light in the blue wavelength range emitted from the excitation light shining device 70B is reduced.

Fourth Embodiment

Next, referring to FIG. 7, a fourth embodiment of the invention will be described. In this embodiment, like reference numerals will be given to like members or portions to those of the first embodiment, and the description thereof will be omitted or simplified.

In this embodiment, in place of the light source unit 60 of the first embodiment, a light source unit 60C is provided which includes an excitation light shining device 70C which emits ultraviolet light which is light in a first wavelength range. The excitation light shining device 70C includes a plurality of laser diodes 71C, constituting a first light source, which emit ultraviolet light. The excitation light shining device 70C is disposed so as to emit ultraviolet light towards a left panel 15 (rightwards in FIG. 7).

A reflecting mirror 75C is provided on a side of the excitation light shining device 70C which faces the left panel 15. The reflecting mirror 75C changes the direction of the axis of ultraviolet light emitted from the excitation light shining device 70C through 90 degrees in the direction of a front panel 12 (downwards in FIG. 7). On the other hand, a first dichroic mirror 141C is provided on a side of the reflecting mirror 75C which faces the front panel 12. Then, a red light source device 120C like the red light source device 120 of the first embodiment is disposed on a side of the first dichroic mirror 141C which faces a right panel 14 (a left-hand side in FIG. 7). The red light source device 120C includes a red light emitting diode which makes up a red light source 121 which constitutes a second light source. The second light source device 120C is disposed so that light in the red wavelength range emitted from the red light source device 120C as light in a second wavelength range is emitted towards the first dichroic mirror 141C.

Figure 7:
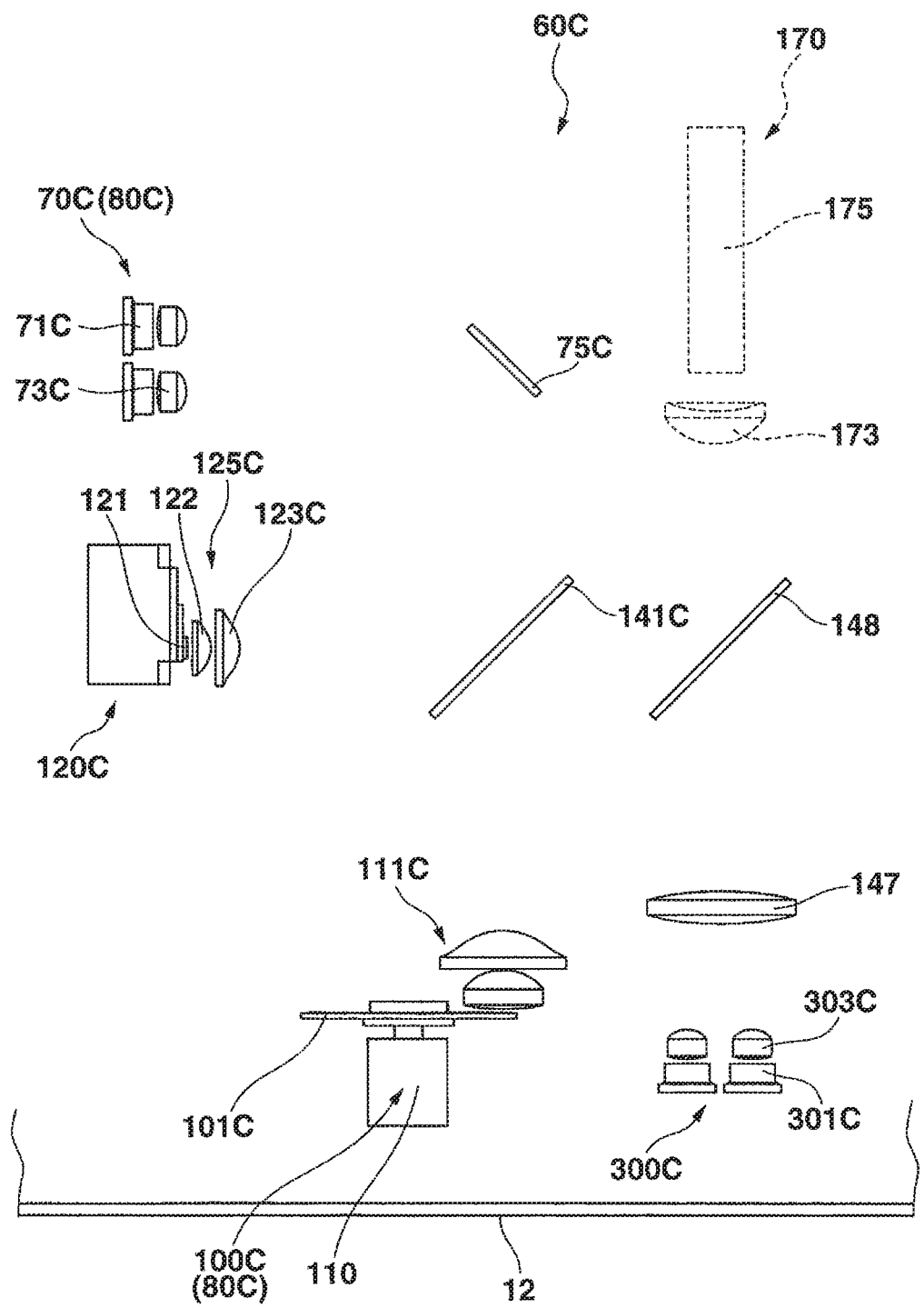
FIG. 7 is a schematic plan view showing a main part of a light source unit according to a fourth embodiment of the invention.

A luminescent plate device 100C is provided on a side of the first dichroic mirror 141C which faces the front panel 12 (a lower side in FIG. 7). The luminescent plate device 100C includes a luminescent plate 101C which takes the form of a luminescent wheel and a motor 110 which drives to rotate the luminescent plate 101C. A luminous light emitting area is formed along a full circumference of the luminescent plate 101C, and a luminescent material layer is laid on the luminous light emitting area. The construction of this luminous light emitting area is similar to that of the luminous light emitting area of the luminescent plate 101 of the first embodiment. A group of collective lenses 111C is disposed in a position which corresponds to a shining spot on the side of the luminescent plate 101C where the luminous light emitting area is formed. Ultraviolet light emitted from the excitation light shining device 70C is shone on to the luminous light emitting area of the luminescent plate 101C via the group of collective lenses 111C. Then, luminous light which is light in the green wavelength range which is light in a third wavelength range emitted from the luminous light emitting area is emitted towards a back panel 13 via the group of collective lenses 111C. In this way, a green light source device 80C is made up of the excitation light shining device 70C and the luminescent plate device 100C.

The first dichroic mirror 141C transmits light in the red wavelength range and ultraviolet light and reflects light in the green wavelength range. Consequently, ultraviolet light emitted from the excitation light shining device 70C is transmitted through the first dichroic mirror 141C by way of the reflecting mirror 75C. The ultraviolet light which is transmitted through the first dichroic mirror 141C is shone on to the luminescent plate 101C byway of the group of collective lenses 111C. Light in the green wavelength range emitted from the luminescent plate device 100C is reflected by the first dichroic mirror 141C so that the direction of the axis of the light in the green wavelength range is changed through 90 degrees in the direction of the left panel 15 (rightwards in FIG. 7). Light in the red wavelength range emitted from the red light source device 120 is transmitted through the first dichroic mirror 141C.

On the other hand, a blue light source device 300C is disposed so that light in the blue wavelength range emitted therefrom is directed towards the back panel 13. The blue light source device 300C includes a plurality of blue laser diodes 301C constituting individually blue light sources and a plurality of collimator lenses 303C which correspond individually to the blue laser diodes 301C. Then, a second dichroic mirror 148 is disposed in a position where light emitted from the blue light source device 300C intersects the light in the red wavelength range which is transmitted through the first dichroic mirror 141C and the light in the green wavelength range which is reflected by the first dichroic mirror 141C. The lights in the red, green and blue wavelength ranges are collected to a light collecting port of a light tunnel 175 via a collective lens 173 of a light source-side optical system 170 by the second dichroic mirror 148.

In this embodiment, almost all ultraviolet light emitted from the excitation light shining device 70C is transmitted through the first dichroic mirror 141C to be shone on to the luminescent plate device 100C. However, a small portion of ultraviolet light emitted from the excitation light shining device 70C is reflected by the first dichroic mirror 141C to be shone on to a group of collective lenses 125C of the red light source device 120C. A second lens 123C of the red light source device 120C is made up of a plastic lens, and a coating which reflects ultraviolet light and transmits light in the red wavelength range is applied to an exit side surface of the second lens 123C. Consequently, the influence imposed on the group of collective lenses 125C which constitutes an optical device of the red light source device 120 by the small portion of ultraviolet light emitted from the excitation light shining device 70C is reduced. The laser diodes 71C can be made up of blue laser diodes 71, and the second lens 123C can also be made up of a second lens 123 to which a coating like the one of the first embodiment is applied. Collimator lenses 73C are disposed on optical axes of the corresponding laser diodes 71C to convert lights emitted from the laser diodes 71C into parallel rays so as to enhance the directivity thereof.

Thus, as has been described heretofore, the light source units 60, 60A, 60B, 60C of the invention include as the first light source the blue laser diodes 71 or the laser diodes 71C which emit light in the blue wavelength range or ultraviolet light which is light in the first wavelength range, the red light source 121, constituting the second light source, which emits light in the red wavelength range which is light in the second wavelength range and the first dichroic mirrors 141, 141B, 141C which are the dichroic mirror on to which light in the first wavelength range and light in the second wavelength range are incident from the directions which differ from each other and which reflects or transmits the light in the first wavelength range and the light in the second wavelength range. The groups of collective lenses 125, 125C which are the optical device or the optical device 125A is provided on the optical path defined between the first dichroic mirror and the second light source. These optical devices include the second lens 123 and the spectral plate 124 which constitute the spectral member to which the coating reflecting or absorbing light in the first wavelength range is applied.

By adopting this configuration, even though a small portion of light in the first wavelength range is reflected by or transmitted through the first dichroic mirrors 141, 141B, 141C towards the second light source to be incident on the groups of collective lenses 125, 125C which are the optical devices or the optical device 125A, the small portion of the light in the first wavelength range is reflected or absorbed by the spectral member. Consequently, even though the light source such as a laser diode which emits highly intense light over a long period of time, it is possible to reduce the influence imposed on the optical parts such as lenses or the like which are provided in the groups of collective lenses 125, 125C which are the optical devices or the optical device 125A by the intense light emitted from the laser diode.

The second lens 123 which is configured as the spectral member is made up of the plastic lens having the coating which reflects or absorbs light in the first wavelength range applied to the surface on the side thereof where light in the second wavelength range exits. By adopting this configuration, it is possible to provide the light source units 60, 60A, 60B, 60C which are made light in weight.

In the group of collective lenses 125 which is the optical device, a configuration can also be adopted in which the first lens 122 made up of the plastic lens is disposed on the exit side of the red light source 121 which is the second light source, and the second lenses 123, 123C which are the spectral members made up of the glass lenses to which the coating which reflects or absorbs light in the first wavelength range is applied are disposed closer to the exit side where light in the second wavelength range exits than the first lens 122. By adopting this configuration, since the plastic lens which is generally produced at lower costs than a glass lens can be used, it is possible to reduce the costs involved in production of the light source units 60, 60B, 60C.

As the spectral member, the spectral plate 124 can be adopted which is made up of the glass plate to which the coating configured to reflect or absorb light in the first wavelength range is applied. By adopting this configuration, the base material of the spectral member can be made up of a member having a simple construction such as a glass plate material. Consequently, it is possible to provide the light source unit 60A whose production costs are much lower.

The first dichroic mirrors 141, 141B, 141C are disposed so as to be inclined substantially at 45 degrees with respect to light in the first wavelength range and light in the second wavelength range. The first light source is the laser diodes 71 which are the semiconductor light emitting devices or the laser diodes 71C which emit ultraviolet light, and the second light source is the red light source 121 which is the semiconductor light emitting device. By adopting this configuration, even though the light source units 60, 60A, 60B, 60C are used which are made up of the laser diodes which emit highly intense light, it is possible to reduce the influence imposed on the optical device disposed between the second light source and the dichroic mirror by the small portion of light in the first wavelength range emitted from the first light source.

The light source units 60, 60A, 60B, 60C include the luminescent plate devices 100, 100B, 100C which emit luminous light in the green wavelength range which is light in the third wavelength range by using light emitted from the first light source as excitation light. By adopting this configuration, it is possible to provide the light source units 60, 60A, 60B, 60C which can provide highly bright luminous light.

The first light source which is the excitation light source can be made up of the blue laser diodes 71, and the luminescent plate device 100 can include the luminescent plate 101 which is the luminescent wheel including the luminous light emitting area and the diffuse transmission area. By adopting this configuration, since the first light source can also be used as the blue light source while being used as the excitation light source, it is possible to provide the light source units 60, 60A which can emit highly bright light source light by using the blue laser diodes 71.

The first light source which constitutes the excitation light source can be made up of the blue laser diodes 71, and the luminescent plate device 100B can include the fixed luminescent plate 101B. By adopting this configuration, since the drive device for the luminescent plate 101B can be omitted, it is possible to reduce the production costs involved in producing the light source unit 60B.

The first light source which constitutes the excitation light source can be made up of the blue laser diodes 71, and the luminescent plate device 100C can be made up of the luminescent plate 101C which is the luminescent wheel including the luminous light emitting area which is provided along the full circumference thereof. By adopting this configuration, it is possible to provide the light source unit which utilizes the luminescent plate device 100C which is configured to prevent the seizing of the luminescent material layer.

In place of the blue laser diodes 71 which make up the first light source which is the excitation light source, the laser diodes 71C can be used which emit ultraviolet light. By adopting this configuration, it is possible to provide the light source units 60, 60A, 60B, 60C which include the excitation light shining device which can emit highly efficient excitation light.

The projector 10 includes anyone of the light source units 60, 60A, 60B, 60C, the display device 51, the projection-side optical system 220 and the projection control unit. By adopting this configuration, it is possible to provide the projector 10 having anyone of the light source units 60, 60A, 60B, 60C which reduce the influence imposed on the group of collective lenses 125 which is the optical device or the optical device 125A which is disposed on the optical path between the first dichroic mirrors 141, 141C which are the dichroic mirrors and the red light source 121 which is the second light source by the blue laser diodes 71 or the laser diodes 71C which constitute the first light source.

As described in the first embodiment to the fourth embodiment, light in the first wavelength range emitted from the first light source and light in the second wavelength emitted from the second light source are incident on the dichroic mirror from the directions which differ from each other. In the case of the spectral member being made up of the plastic lens, the coating does not have to be applied to both the sides of the plastic lens, and hence, the coating should be applied to the side of the plastic lens where light in the second wavelength range exits.

The embodiments that have been described heretofore are presented as the examples, and there is no intention at all to limit the scope of the invention by those embodiments. These novel embodiments can be carried out in other various forms, and hence, various omissions, replacements, alterations and modifications can be made thereto without departing from the spirit and scope of the invention. The resulting embodiments and their modifications are included in the spirit and scope of the invention and are also included in the scope of inventions claimed under claims and their equivalents.

What is claimed is:

1. A light source unit having:
a first light source which emits light in a first wavelength range;
a second light source which emits light in a second wavelength range which differs from the light in the first wavelength range;
a dichroic mirror to which the light in the first wavelength range and the light in the second wavelength range are incident from directions which differ from each other and which transmits a portion of the light in the first wavelength range, reflects a smaller portion of the light in the first wavelength range than the portion of the light in the first wavelength range which is transmitted and transmits the light in the second wavelength range, or reflects a portion of the light in the first wavelength range, transmits a smaller portion of the light in the first wavelength range than the portion of the light in the first wavelength range which is reflected and reflects the light in the second wavelength range; and
an optical device which is disposed on an optical path defined between the dichroic mirror and the second light source, wherein
the optical device is a spectral member to which a coating is applied which transmits the light in the second wavelength range and reflects or absorbs the smaller portion of the light in the first wavelength range.

2. The light source unit according to claim 1, wherein the spectral member is made up of a plastic lens to a side of which the coating is applied, the side being where the light in the second wavelength range exits.

3. The light source unit according to claim 1, wherein the optical device has a plastic lens, and wherein
the spectral member is a glass lens to which the coating is applied and which is disposed closer to the side where the light in the second wavelength range exits than the plastic lens.

4. The light source unit according to claim 1, wherein the spectral member is a spectral plate to which the coating is applied.

5. The light source unit according to claim 1, wherein the dichroic mirror is disposed substantially at 45 degrees with respect to the light in the first wavelength range and the light in the second wavelength range, and wherein
the first light source and the second light source are made up of semiconductor light emitting devices.

6. The light source unit according to claim 2, wherein the dichroic mirror is disposed substantially at 45 degrees with respect to the light in the first wavelength range and the light in the second wavelength range, and wherein
the first light source and the second light source are made up of semiconductor light emitting devices.

7. The light source unit according to claim 3, wherein the dichroic mirror is disposed substantially at 45 degrees with respect to the light in the first wavelength range and the light in the second wavelength range, and wherein
the first light source and the second light source are made up of semiconductor light emitting devices.

8. The light source unit according to claim 4, wherein the dichroic mirror is disposed substantially at 45 degrees with respect to the light in the first wavelength range and the light in the second wavelength range, and wherein
the first light source and the second light source are made up of semiconductor light emitting devices.

9. The light source unit according to claim 5, having:
a luminescent plate device which emits luminous light in a third wavelength range by using light emitted from the first light source as excitation light.

10. The light source unit according to claim 6, having:
a luminescent plate device which emits luminous light in a third wavelength range by using light emitted from the first light source as excitation light.

11. The light source unit according to claim 7, having:
a luminescent plate device which emits luminous light in a third wavelength range by using light emitted from the first light source as excitation light.

12. The light source unit according to claim 8, having:
a luminescent plate device which emits luminous light in a third wavelength range by using light emitted from the first light source as excitation light.

13. The light source unit according to claim 9, wherein the first light source is a blue laser diode which emits light in a blue wavelength range; wherein
the second light source is a red light emitting diode which emits light in a red wavelength range; and wherein
the luminescent plate device has a luminescent wheel comprising a luminous light emitting area on to which the light in the blue wavelength range is shone to thereby emit light in a green wavelength range and a diffuse transmission area which is provided end-to-end with the luminous light emitting area in a circumferential direction and which transmits directly or diffusely the light in the blue wavelength range.

14. The light source unit according to claim 10, wherein the first light source is a blue laser diode which emits light in a blue wavelength range; wherein
the second light source is a red light emitting diode which emits light in a red wavelength range; and wherein
the luminescent plate device has a luminescent wheel comprising a luminous light emitting area on to which the light in the blue wavelength range is shone to thereby emit light in a green wavelength range and a diffuse transmission area which is provided end-to-end with the luminous light emitting area in a circumferential direction and which transmits directly or diffusely the light in the blue wavelength range.

15. The light source unit according to claim 9, wherein
the first light source is a blue laser diode which emits light in a blue wavelength range as the excitation light; wherein
the second light source is a red light emitting diode which emits light in a red wavelength range; and wherein
the luminescent plate device has a fixed luminescent wheel on to which the excitation light is shone to thereby emit light in a green wavelength range, and having further:
a blue light source device which emits light in a blue wavelength range.

16. The light source unit according to claim 10, wherein
the first light source is a blue laser diode which emits light in a blue wavelength range as the excitation light; wherein
the second light source is a red light emitting diode which emits light in a red wavelength range; and wherein
the luminescent plate device has a fixed luminescent wheel on to which the excitation light is shone to thereby emit light in a green wavelength range, and having further:
a blue light source device which emits light in a blue wavelength range.

17. The light source unit according to claim 9, wherein
the first light source is a blue laser diode which emits light in a blue wavelength range as the excitation light; wherein
the second light source is a red light emitting diode which emits light in a red wavelength range; and wherein
the luminescent plate device comprises a luminescent wheel having a luminous light emitting area on to which the excitation light is shone to thereby emit light in a green wavelength range, and having further:
a blue light source device which emits light in a blue wavelength range.

18. The light source unit according to claim 10, wherein
the first light source is a blue laser diode which emits light in a blue wavelength range as the excitation light; wherein
the second light source is a red light emitting diode which emits light in a red wavelength range; and wherein
the luminescent plate device comprises a luminescent wheel having a luminous light emitting area on to which the excitation light is shone to thereby emit light in a green wavelength range, and having further:
a blue light source device which emits light in a blue wavelength range.

19. The light source unit according to claim 13, wherein
the first light source utilizes a laser diode which emits ultraviolet light in place of the blue laser diode.

20. A projector comprising:
the light source unit according to claim 1;
a display device on to which light source light from the light source unit is shone to thereby form image light;
a projection-side optical system which projects the image light emitted from the display device on to a screen; and
a projector control unit which controls the display device and the light source unit.

* * * * *